Oct. 24, 1950  E. E. SELHOST  2,526,908
STATIC ELECTRICITY GROUNDING DEVICE
Filed Aug. 13, 1949
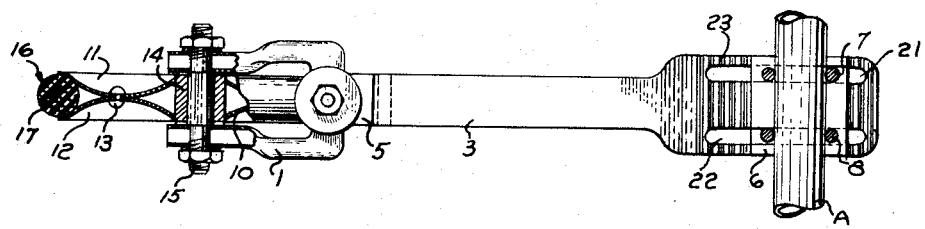
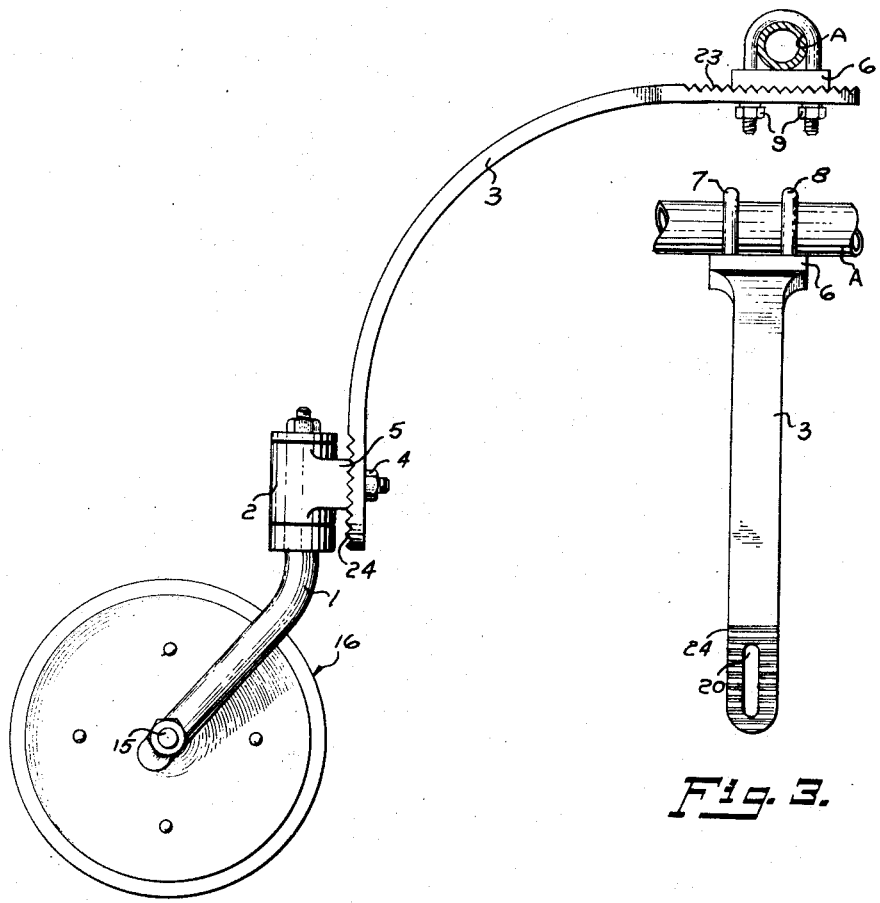
INVENTOR.
EDWARD E. SELHOST
BY O. O. Martin
ATTORNEY Patented Oct. 24, 1950

2,526,908

UNITED STATES PATENT OFFICE 2,526,908

STATIC ELECTRICITY GROUNDING DEVICE

Edward E. Selhost, Glendale, Calif.

Application August 13, 1949, Serial No. 110,164

5 Claims. (Cl. 175—264)

The present invention relates to motor vehicles and has particular reference to improved means for grounding the static electricity generated within such vehicles during operations thereof.

The means conventionally employed to ground such static electricity consists of a short chain which is held suspended from the rear axle or other metallic part of the vehicle. This chain is long enough to cause the end link, or links thereof, to slide along the ground surface during operation of the vehicle. While such chain normally functions perfectly, danger is present that, due to sudden jolts of the vehicle, the chain may rebound sufficiently to cause the end thereof to swing over the vehicle axle or otherwise to be held away from the ground. In fact, cases are on record where this has happened, resulting in the destruction of vehicles by fire, due to consequent accumulation of static electricity, as well as concurrent loss of life.

It is, in view of the foregoing, the general object of the present invention to provide an electricity grounding mechanism which will continue to function under all operating conditions and which cannot be rendered inoperative by sudden jolts or vibrations of the vehicle, no matter how violent or persistent. Another object is to provide a static grounding device which may readily be adjusted to suit the type of vehicle it is to serve.

More specifically, it is the object of my invention to provide current grounding means in the form of a caster which, by resilient means, is securely mounted in position on a vehicle.

The wheel of the caster combination is fitted with a solid rubber tire of the size and consistency necessary to assure perfect contact with the ground over a long period of time. And, most important of all, in which throughout the rubber of the tire is distributed a sponge-like skeleton of metallic, current conducting material the individual particles of which are closely enough packed together to assure grounding of any static electricity reaching from the vehicle body, through the caster wheel framing to the tire. Or the conducting material embodied in the tire may take the form of a loosely wound web of fine current conducting wire. In fact, any metallic skeletonized structure which may be incorporated in a solid rubber tire to conduct static electricity through the tire to the ground may be utilized.

With these and other objects in view, the invention resides in the combinations hereinafter fully described and reference is invited to the accompanying drawings in which a preferred form of the invention is illustrated.

In the drawings:

Fig. 1 is a side elevational view of a device embodying the invention and with a portion of the wheel thereof in section better to show the construction thereof;

Fig. 2 is a substantially corresponding plan view of the major portion of the device; and Fig. 3 is an end view of the caster support as it appears when the caster has been removed therefrom.

The caster combination of the invention includes a bifurcated frame 1 which is rotatably seated within a bearing member 2. A resilient band 3 is clamped in position on a lug 5 of this member, as by means of a bolt 4. The upper end of this band is designed for attachment to the metallic part of a vehicle, preferably the rear wheel axle. This may be done by mounting a plate 6 in position on the end of the band and this plate is shown perforated to receive U-bolts 7, 8, embracing the axle A of the vehicle. Nuts 9 are applied to the ends of these bolts to clamp the device firmly in position on the axle.

The wheel 10 of the caster may conveniently be made from a pair of flanges 11, 12 which, by means of rivets or bolts 13, are rigidly clamped in position on a hub 14 and a bolt 15 extends through this hub and the perforated ends of the frame 1 to maintain the wheel rotatably in position therein.

A solid rubber tire 16 is mounted in this wheel between the flanges 11, 12 and in this tire is embedded a current conducting webbing or network 17, composed of loosely scattered particles or loosely wound fine wire. When the current conducting contents of the rubber tire are packed closely enough to short circuit any static electricity accumulating in the metal parts of the vehicle and the caster, and when the caster wheel is held correctly suspended therefrom, it is found that all static electricity will be instantly and completely grounded. Also that, while the wheel may be caused to bounce considerably during the operation of the vehicle, all danger of disruption of contact with the ground over even a short period of time is eliminated.

In order to make it possible readily to adapt the device to vehicles of different types and sizes, it is necessary to provide means for adjusting the caster support both vertically and horizontally. The lower end of the resilient band is for this purpose shown made with a slot 20 through which the bolt 4 extends. The upper end of the band is similarly fitted with two parallel slots 21, 22, in which the U-bolts 7, 8 are seated. When these slots are of sufficient length, it is seen that the caster may be adjusted to serve the various sizes and types of motor vehicles ordinarily found on the highway. It is furthermore necessary, in order to maintain the device always in its adjusted position, to provide means for preventing slipping or sliding of the band when subjected to severe jolts, and the contacting end surfaces of the band are for this purpose shown transversely serrated at 23, 24 to seat in similar transverse grooves of the lug 5 and the plate 6. When so mounted, it is seen that no relative movement of the parts is possible. Since, in addition, it is possible somewhat to modify the angular position of the plate 6 and the band relative to the axle at the time these parts are clamped in position thereon, it should be possible to adjust the device to serve any type or size of motor vehicle on the road.

It should also be remembered that since the band 3 is made from resilient material, such as spring steel, it will adapt itself to great variations in the road surface as well as to minor differences in the vehicles on which the device is mountable. But while I have herein described a preferred form of the invention, I do not thereby intend to be limited to the shapes, proportions and arrangements exactly as shown, but reserve the right to embody modifications within the scope of the claims hereto appended.

I claim:

1. For attachment to a motor vehicle having a rear axle, a static grounding device including a caster the bearing whereof is made with a lug projecting therefrom, said lug having a vertically directed transversely serrated surface, a ground conducting tire on the caster wheel, a plate having a transversely serrated bottom surface, a rearwardly and downwardly curved arm having transverse serrations at the ends thereof for engagement with the serrations of the lug and plate, means for clamping the lower end of the arm in position on the lug, and means straddling the vehicle axle and extending through said plate and the upper end of the arm to clamp the arm in position on the axle.

2. A static grounding device for a motor vehicle having a rear axle comprising, a conducting caster having a lug on the bearing thereof, the outer surface of said lug being disposed parallel with the vertical axis of the caster, a curved resilient band the lower end of which is clamped in position on said lug for vertical adjustment thereon, a plate having perforations therethrough, U-bolts seated in said perforations to encompass said rear axle, the upper end of the band having elongated perforations through which said U-bolts extend, and means engaging the bolts to clamp the plate and the band in position on said axle.

3. A static grounding device for a motor vehicle having a rear axle comprising, a caster having a static conducting tire on the wheel thereof and a lug on the bearing thereof, the outer surface of said lug being disposed parallel with the vertical axis of the caster, a curved resilient band the lower end of which is clamped in position on said lug for vertical adjustment thereon, a plate having perforations therethrough, U-bolts seated in said perforations to encompass said rear axle, the upper end of the band having elongated perforations through which said U-bolts extend, and means engaging the bolts to clamp the plate and the band in position on said axle.

4. A static grounding device for a motor vehicle having a rear axle comprising, a caster having on the bearing thereof a lug the surface of which is parallel with the vertical axis of the caster, there being transverse serrations in said surface, a perforated plate, U-bolts engaging the perforations of the plate and encompassing said rear axle, the underside of said plate being transversely serrated, a curved resilient band having elongated perforations at the upper end thereof for receiving said U-bolts and made with transverse serrations engaging the serrations of the plate, nuts engaging the ends of the U-bolts to clamp the end of the band and the plate rigidly in position on the axle, and means for clamping the lower end of the band in position on said lug, the lower end of the band and the surface of the lug having interfitting transverse serrations.

5. A static grounding device for a motor vehicle having a rear axle comprising, a caster having on the bearing thereof a lug the surface of which is parallel with the vertical axis of the caster, there being transverse serrations in said surface, a perforated plate, U-bolts engaging the perforations of the plate and encompassing said rear axle, the underside of said plate being transversely serrated, a curved resilient band having elongated perforations at the upper end thereof for receiving said U-bolts and made with transverse serrations engaging the serrations of the plate, nuts engaging the ends of the U-bolts to clamp the end of the band and the plate rigidly in position on the axle, the lower end of the band having an elongated perforation therethrough, and means extending through said perforation and seatable in the surface of the lug to clamp the band in vertically adjustable position thereon, the contacting surfaces of the band and the lug having transverse interfitting serrations.

EDWARD E. SELHOST.

REFERENCES CITED

The following references are of record in the file of this patent:

UNITED STATES PATENTS

| Number | Name | Date |
|---|---|---|
| 1,937,842 | Putnam | Dec. 5, 1933 |
| 2,280,327 | Ware | Apr. 21, 1942 |